(12) United States Patent
Consens

(10) Patent No.: US 6,507,846 B1
(45) Date of Patent: Jan. 14, 2003

(54) INDEXING DATABASES FOR EFFICIENT RELATIONAL QUERYING

(75) Inventor: Mariano Paulo Consens, Waterloo (CA)

(73) Assignee: Joint Technology Corporation, Ontario (CA)

( * ) Notice: Subject to any disclaimer, the term of this patent is extended or adjusted under 35 U.S.C. 154(b) by 0 days.

(21) Appl. No.: 09/437,766

(22) Filed: Nov. 9, 1999

(51) Int. Cl.[7] ............................................... G06F 17/30
(52) U.S. Cl. ............................... 707/100; 707/2; 707/9; 707/10; 707/103.1; 707/104.1; 345/356
(58) Field of Search ................... 707/1–10, 100–104.1; 345/356, 854; 709/231, 102, 226, 215

(56) References Cited

U.S. PATENT DOCUMENTS

| | | | | |
|---|---|---|---|---|
| 4,644,471 A | * | 2/1987 | Kojima et al. ................. | 707/3 |
| 5,926,807 A | * | 7/1999 | Peltonen et al. ............... | 707/3 |
| 6,154,213 A | * | 11/2000 | Rennison et al. ........... | 345/428 |
| 6,272,495 B1 | * | 8/2001 | Hetherington ............... | 707/101 |
| 6,275,822 B1 | * | 8/2001 | Consens et al. ............... | 707/1 |

OTHER PUBLICATIONS

Ellen M. Voorhees, "Query expansion using lexical–semantic relations", 1994, Sringer–Verlag New York, Inc, NY, USA, ISBN:0–387–198889–X, pp. 61–69.*

Adam et al., "A form–based Natural Language from–end to a CIM database", Mar.–Apr. 1997, ISSN: 1041–4347, pp. 238–250.*

* cited by examiner

*Primary Examiner*—John Breene
*Assistant Examiner*—Mohammad Ali
(74) *Attorney, Agent, or Firm*—Beyer Weaver & Thomas, LLP

(57) ABSTRACT

Provided is an indexing system for structured or semi-structured source data comprising a tokenizer for accepting source data and generating tokens representing the source data, the tokens from the tokenization representing the source data in a relational view, where for tokens representing a subset of the source data, the system generates tokens identifying the table and column of the subset of the data in the relational view of the source data, and an index builder for building index structures based on the tokens generated by the tokenizer, the index builder creating indexes which comprise a set of positional indexes for indicating the position of token data in the source data, a set of lexicographical indexes comprising a sort vector index and a join bit index, associated with the sort vector index, a set of data structures mapping between the lexicographical indexes and the positional indexes.

20 Claims, 4 Drawing Sheets

INDEXING DATABASES FOR EFFICIENT RELATIONAL QUERYING

FIELD OF THE INVENTION

The present invention is directed to an improvement in relational database systems and in particular to the indexing of relational databases to permit efficient relational queries on databases.

BACKGROUND OF THE INVENTION

In relational database systems, it is important to create indexes on columns of the tables in the database. It is well-known that the efficiency of relational operations such as the JOIN operation or the evaluation of query constraints (SELECTION) is improved if the relevant columns of the table across which the operation take place are indexed.

There have been many approaches to the problem of efficiently creating indexes for relational database tables that support fast access, and that use limited amounts of storage. The B-tree and variations are well-known data structures used for indexing relational databases.

From the point of view of speeding query processing, it is desirable to have available indexes for all columns (and combinations) of all tables in a relational database. However, it is often not advantageous (or even feasible) to do so, since the time required to individually create the indexes, and the storage used by all the indexes after creation, is prohibitive.

It is therefore desirable to simultaneously create a large number of indices on all the tables of a database in a space and time efficient manner.

SUMMARY OF THE INVENTION

According to one aspect of the present invention, there is provided an improved index for relational databases.

According to a further aspect of the present invention, there is provided an indexing system for structured or semi-structured source data comprising a tokenizer for accepting source data and generating tokens representing the source data, the tokens from the tokenization representing the source data in a relational view, where for tokens representing a subset of the source data, the system generates tokens identifying the table and column of the subset of the data in the relational view of the source data, and an index builder for building index structures based on the tokens generated by the tokenizer, the index builder creating indexes which comprise a set of positional indexes for indicating the position of token data in the source data, a set of lexicographical indexes for indicating the lexicographical ordering of all tokens, the set of lexicographical indexes comprising a sort vector index and a join bit index, associated with the sort vector index, a set of data structures mapping between the lexicographical indexes and the positional indexes, comprising a lexicographic permutation data structure, the index builder creating a temporary sort vector data structure for generating the lexicographic permutation data structure and the sort vector index.

According to a further aspect of the present invention, there is provided a method for accessing the indexing system to carry out relational queries involving comparisons of data in the source data, the method comprising the steps of accessing the sort vector index for tokens corresponding to source data to be compared, determining, by following the associated join bit index, whether the source data to be compared, as indexed in the sort vector index, matches, signalling whether the source data matches or does not match. According to a further aspect of the present invention, the method comprises the further step of utilizing the positional indexes to return source data when a match is signalled.

According to a further aspect of the present invention, there is provided a method for indexing structured or semi-structured source data comprising the steps of accepting source data and generating tokens representing the source data, the tokens from the tokenization representing the source data in a relational view, where for tokens representing a subset of the source data, the system generates tokens identifying the table and column of the subset of the data in the relational view of the source data, and building index structures based on the tokens generated by the tokenizer, the step of building index structures further comprising the steps of building a set of positional indexes for indicating the position of token data in the source data, building a set of lexicographical indexes for indicating the lexicographical ordering of all tokens, the set of lexicographical indexes comprising a sort vector index and a join bit index, and building a set of data structures mapping between the lexicographical indexes and the positional indexes, comprising a lexicographic permutation data structure, the sort vector index and the lexicographic permutation data structure being built from a temporary sort vector data structure.

According to a further aspect of the present invention, there is provided a computer program product tangibly embodying a program of instructions executable by a computer to perform the above method.

Advantages of the present invention include the provision of indexes for columns of tables in relational databases which require relatively small amounts of storage, and which are capable of being accessed efficiently. A further advantage relates to minimizing disk access to help process queries much faster than traditional SQL products.

BRIEF DESCRIPTION OF THE DRAWINGS

The preferred embodiment of the invention is shown in the drawings, wherein.

Figure 1:
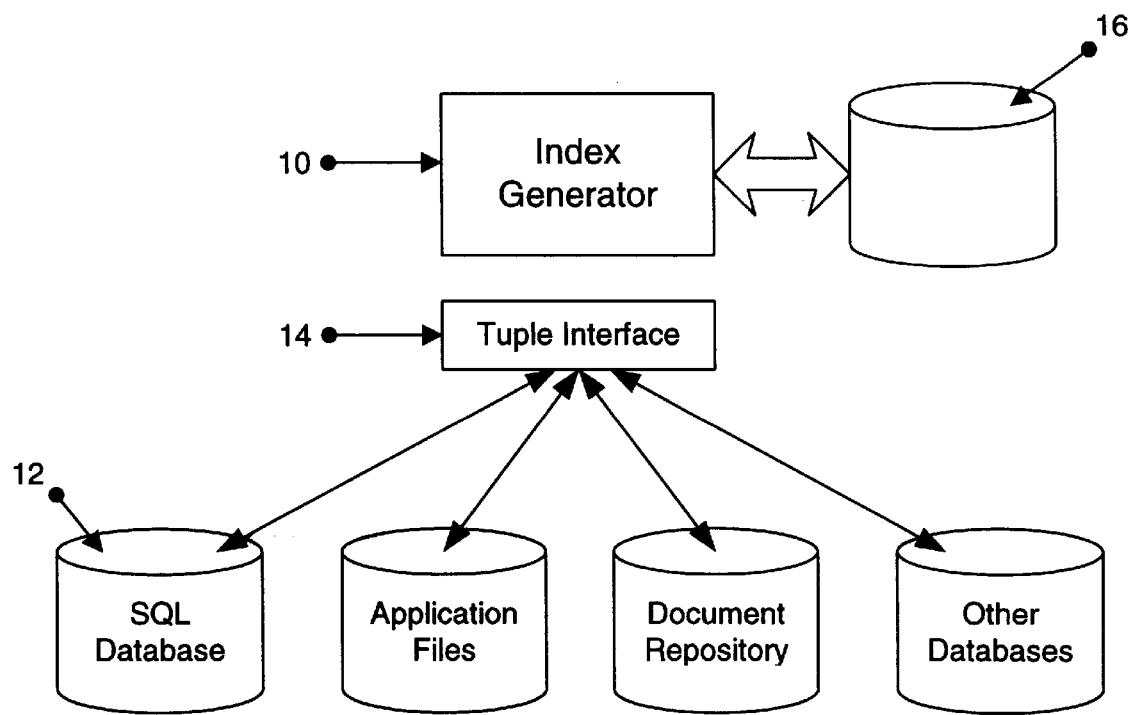
FIG. 1 is a block diagram illustrating the structure of the index generator of the preferred embodiment of the invention.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 is a block diagram representing the architecture of the index generator 10 of the preferred embodiment of the invention. FIG. 1 includes data sources 12, which are shown in the preferred embodiment as data sources accessed through a tuple interface 14, an interface layer capable of providing tuples from relational tables (such as ODBC, JDBC, OLE-DB, etc.). The index generator of the invention is capable of handling any data presented through the tuple interface, and produces an index 16 (a set of data structures described later) that is relatively small in size and is capable of being accessed to perform SQL operations. Both structured data sources (e.g., SQL relational databases or other databases) and semi-structured data sources (e.g., data from application files such as word processing documents or spreadsheets, or document repositories containing e-mail files, or SGML, HTML, XML tagged files) are supported. The index generator knows of the presence of one relational key for each table in each data sources that can be used to efficiently request individual tuples from the data sources.

Figure 2:
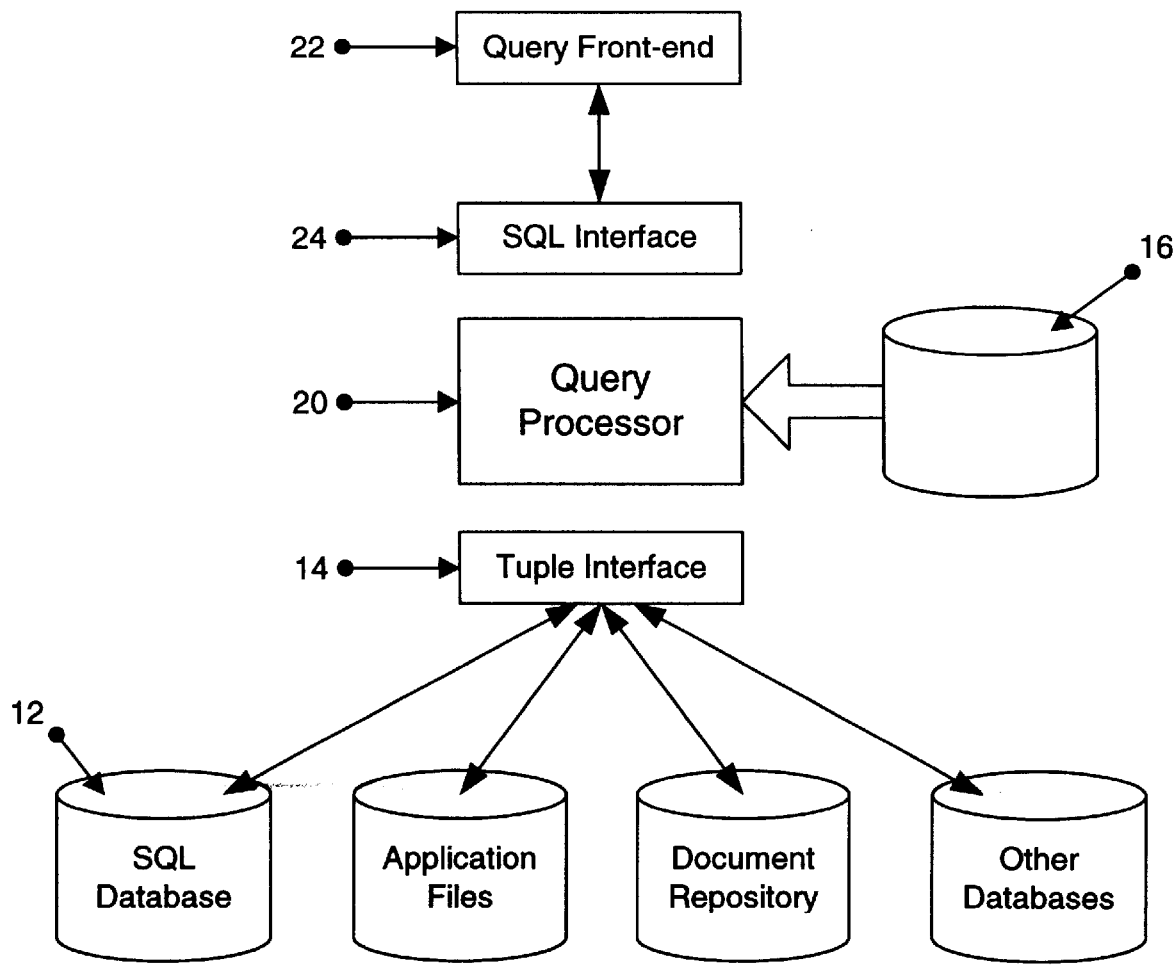
FIG. 2 is a block diagram illustrating the structure of the query processor of the preferred embodiment of the invention.

The structure of the query processor 20 which makes use of the index 16, is shown in FIG. 2. This figure shows query front-end 22 (an application program issuing SQL queries) that passes SQL queries to a SQL interface layer 24 (ODBC in the preferred embodiment) which sends the query to the query processor 20. The query processor 20 uses the information in the index 16 to fully resolve the query by obtaining the keys of all the tuples that are part of the answer, using these keys to request, through the tuple interface 14, all the relevant tuples from the data sources 12. The query processor 20 assembles the data coming from the relevant tuples from the data sources into the answer table, which is then sent through the SQL interface 24 back to the requesting query front-end 22.

Where a query contains no conditions or joins, the query processor can pass the query directly to the data sources 12. Where a query requires no data from columns of the tuples in the data sources, such as a COUNT query, the query processor returns the answer to the query front-end without contacting the data sources.

Since the index generator 10 of FIG. 1 and the query processor 20 of FIG. 2 both rely on the standard API of the tuple interface 14, the actual layer of code implementing the tuple interface can be changed from index generation to query processing. Similarly, since the data sources 12 are accessed through the tuple interface layer, the actual data sources can be changed from index generation to query processing. If the data sources are changed, suitable copies of tuples from the tables that were indexed should be present in the changed data sources when they are requested by the query processor.

The index generator system of the preferred embodiment converts a table from a relational database into a token stream by requesting all the tuples of the tables in the data sources. An example table (Table R) is set out below in Example 1.

| A | B |
|---|---|
| Joe Smith | abc cde |
| Sara Smith | abc xyz |

EXAMPLE 1

In creating the token stream, each value in the table is prefixed by a special attribute token identifying the table (in the example, table R) and column (either A or B) that the value comes from. The system maintains information about which tables belong to which data sources, along with further relevant information about the indexed data source schema in a relational catalog.

The values from the table are also broken up into tokens, usually on spaces between words. The table in Example 1 is represented by the relational token string of Example 2 below, where each individual token appears underlined:

@R.A Joe Smith @R.B abc cde @R.A Sara Smith @R.B abc xyz

EXAMPLE 2

In the token string of Example 2, all values from the table are prefixed by a special attribute token that starts with the character "@" and identifies the table ("R") and the column for the value that follows ("A" or "B").

The tokenization process of the index generator of the preferred embodiment is based on textual tokens. While tokens are directly generated when the values in the relational table are text values, the tokenizer must translate numerical values into a representation that will maintain a correct numerical ordering of the represented numeric data when applying a textual ordering of the representation. The method for generating the numerical-data representations for the indexed data is not set out here but is known to those skilled in the art.

As is apparent from the above description, all columns of all tables in the data sources are tokenized in the preferred embodiment. The tokenization process can be made more efficient by processing several token streams in parallel. It is possible to create token streams which relate to only certain specified columns of certain tables. Those columns that are not indexed in accordance with the preferred embodiment will not be available to the query processor.

Index 16 in FIGS. 1 and 2 does contain a number of different data structures which collectively make up the final index represented in those figures. The description below centres on the functions carried out by the index generator 10, and in particular on the data structures which are created by the index generator 10.

The index of the preferred embodiment has several data structures that are created by the index generator. The data constructs of the preferred embodiment may be loosely grouped in two. First, those data structures which relate to the position of the token data (which provide information about where in the data source tuples are found), and second those data structures which are based on a lexicographic ordering of the tokens (which provide information to resolve comparisons of the source data). Included in the data structures provided are those that themselves carry out a mapping between position related data structures and the data structures that relate to lexicographically sorted tokens. This permits the index to locate tuples in the source data that the index identifies as matching a query constraint or subject to a join operation.

The data structures which relate to the position of the data are described with reference to FIG. 3, in which file 30 represents the token stream (TS). Those skilled in the art will appreciate that the description of the data structures will be applicable for the entire token stream, or for a subset.

Figure 3:
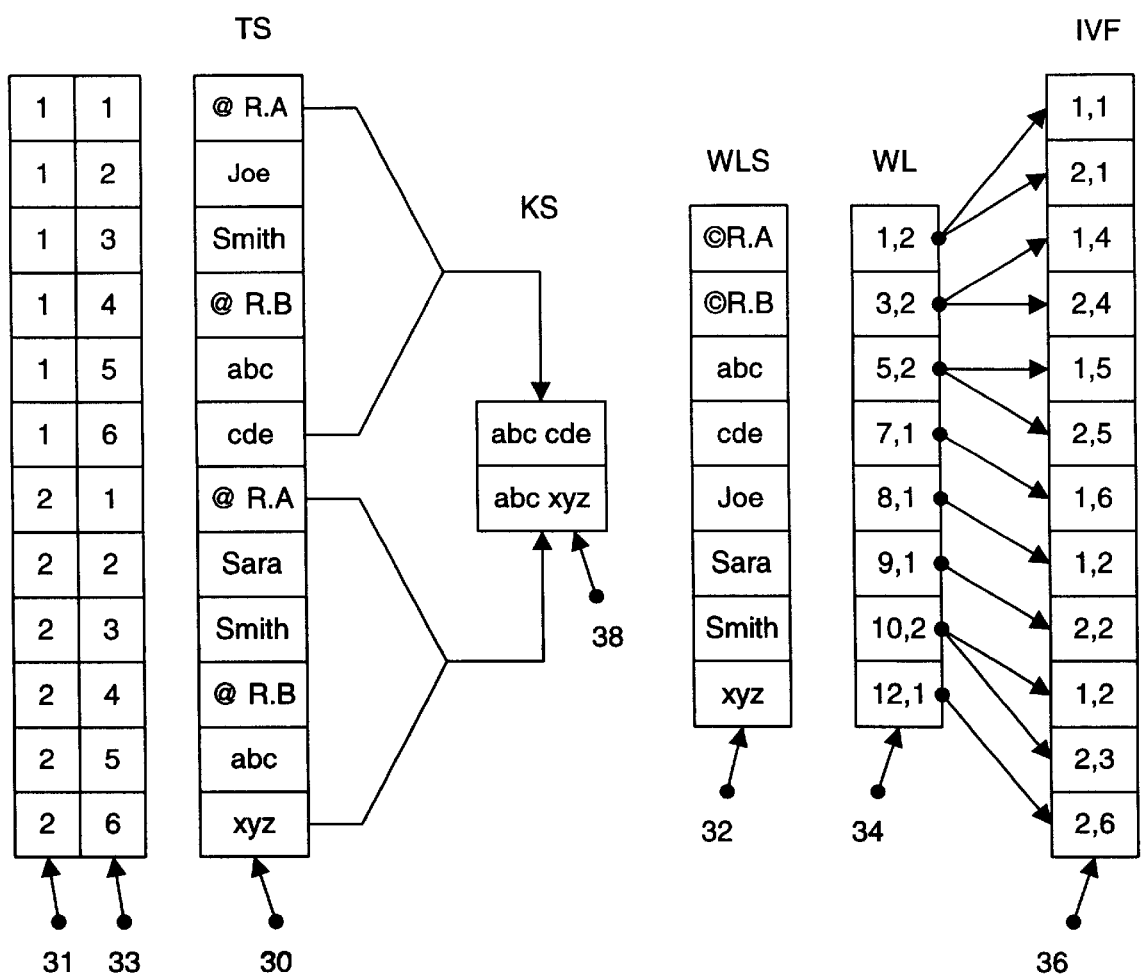
FIG. 3 is a schematic representation of the data structures for position-ordering of the data in the preferred embodiment.

FIG. 3 also includes file 32 representing the Word List Strings file (WLS). File 34 represents the Word List file (WL), and file 36 the Inverted file (IVF). FIG. 3 also includes a depiction of file 38 the Keys file (KS). Although FIG. 3 shows files, it will be apparent to those skilled in the art that any appropriate data structure may be used to represent the data.

The WLS file 32 is a sorted list of all unique tokens in the token stream. The WLS structure is used most often in conjunction with the WL file 34 to point to the runs within other structures that contain information for the corresponding token.

The IVF 36 maps the position of unique tokens into their original data source. IVF file 36 contains as many entries as the total number of tokens in the input stream. Each entry contains a link to a tuple within the data source. The information that is stored includes the tuple id 31, and the offset of the taken within the tuple 33. The tuple id points to the value of the keys that can be found in the KS file 38 (and hence the keys values can be used to request the tuple from the data source). In the example in the figure it is assumed that column B is a suitable key for relation R. The runs corresponding to each token in the IVF file 36 are sorted alphabetically in the token stream, and within each run the entries are sorted in position order.

WL file 34 is used to map a token from WLS file 32 into IVF file 36. WL file 34 contains one entry for each unique token in the stream (same number of entries as WLS file 32). Each entry contains an offset into IVF file 36 and a run length. The offset indicates where the token run starts in IVF file 36, and the length represents the number of entries in IVF file 36 for that token.

The process of constructing the WL, WLS, IVF and KS files, that is carried out by the index generator of the preferred embodiment is known to those skilled in the art.

Note that the WL also maps into the SV structure (described below), since IVF file 36 and the SV have the same number of runs corresponding to the same unique tokens.

The generation of the sort vector data structure is accomplished as described below. As will be apparent, the sort vector is created by first building a temporary sort vector data structure (.tsv file). This data structure is similar to the sort vector, but the entries are not sorted lexicographically. In other words, the temporary sort vector contains data which will permit the source data to be rebuilt, by following the self-referential links in the temporary sort vector. The temporary sort vector does not, however, contain information which shows the relative lexicographical values of the tokens in the sort vector.

To generate the sort vector from the temporary sort vector, a lexicographical sort is performed on the entries in the temporary sort vector, and during the sort process, a permutation is created (this reflects the mapping of the entries in the temporary sort vector into the entries in the sort vector). The permutation data is stored in a file referred to as the lexicographic permutation file (.lp file).

The sort vector itself does not contain information about where in the source data the tokens in the sort vector are located. It is the .ivf file which maintains this information. However, the temporary sort file maps to the .ivf file and therefore maintaining the .lp file permits a token in the sort vector file to be found in the source data, by following the .lp link to the .ivf file. The location in the source data is directly read from the .ivf file.

It is combination of the sort vector, the . permutation file and the inverted file which permit data in the sort vector to be mapped to the source file.

Figure 4:
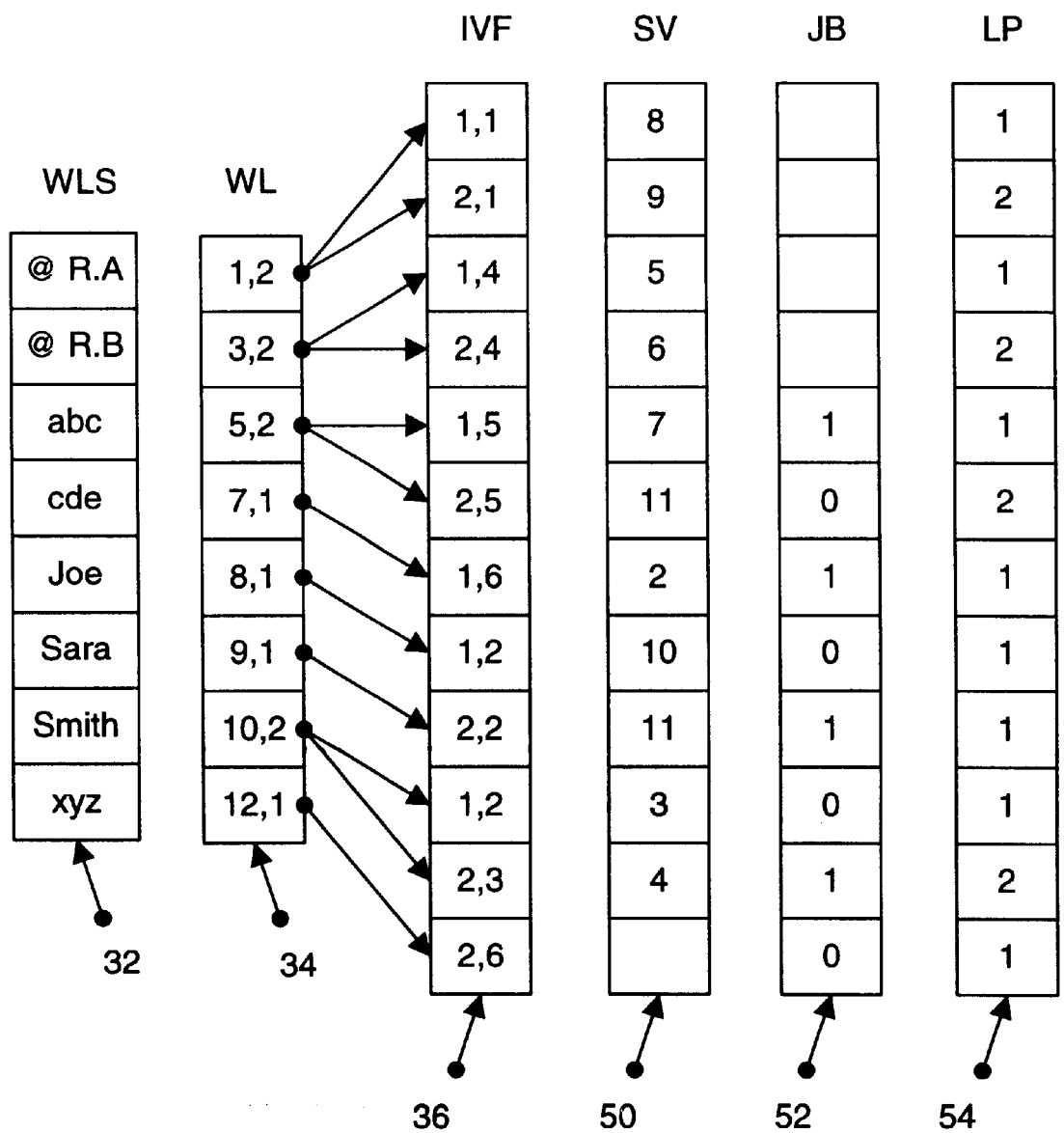
FIG. 4 is a schematic representation of the data structures for lexicographic-ordering of the data in the preferred embodiment.

FIG. 4 represents the data structures which relate to the lexicographic sort of the token. Sort Vector (SV) file 50, Join Bit (JB) file 52, and Lexicographic Permutation (LP) file 54 are shown in FIG. 4. The SV structure is used to reconstruct the ordering of the token stream. SV file 50 contains one entry for each token (same number of entries as IVF file 36). It is sorted lexicographically, which is a different ordering than IVF file 36 (although for the example in the figure the orderings coincide).

A lexicographic sort may be thought of as an alphanumeric sort of tokens where tokens of identical value are arranged by considering the tokens which follow the identical value tokens in the token stream. The token stream of Example 3 (each token consists of three characters) can be used to illustrate a lexicographic sort:

Stream: abc xyz abc efg
Token#: 1 2 3 4

EXAMPLE 3

The lexicographical sorting by token number is: 3, 1, 4, 2. Token 3 is first since when the token 'abc' is considered with the token stream which follows it ('efg'), the token sorts before 'abc' when considered with its following token stream ('xyzabcefg'). In other words, 'abcefg' sorts before 'abcxyzabcefg'.

Each entry in the SV file 50 (represented by the right column in SV file 50 shown in FIG. 4) is an index into SV file 50, itself. The entry in SV file 50 points to the token that follows that word. Each attribute chain of tokens is ended by an index to the zero entry, which is reserved for this purpose. By following the chain of entries in SV file 50, each attribute value can be reconstructed by using the SV structure.

Example 4 shows the SV structure for a simple stream of single character tokens. Each SV entry is an index to the token following that word in the token stream. For example, the entry for the token 'd' is 1, meaning that the word in position 1 ('a') follows the 'd' in the token stream. Notice that the third entry is for the last token 'b', and its value is 0 indicating that 'b' ends the token stream.

Token Stream: a f b d a f b
Lexicographical order: 2 7 4 5 1 6 3

| Token | Following tokens | SV structure |
|---|---|---|
| a | fb | 6 |
| a | fbdafb | 7 |
| b |  | 0 |
| b | dafb | 5 |
| d | afb | 1 |
| f | b | 3 |
| f | bdafb | 4 |

EXAMPLE 4

FIG. 4 also shows JB table 52 which is related to the SV file 50 and may be used to perform SQL table joins. JB table 52 contains the same number of entries as SV file 50. Each entry (the left column in JB table 52) is a pointer to the next entry, or a null pointer. This can be implemented simply by a single bit (0 or 1). Two adjacent entries in JB table 52 are the same value (i.e. either both 0 or both 1) if and only if the token that the two entries respectively correspond to have identical following tokens in the token strings representing the attributes in which the tokens are found. In other words, the lexicographic values of the two tokens (relative to their respective attributes) is identical. Recall that the SV chaining is stopped at the end of each attribute, so the comparison for setting the JB bits checks the attribute values only.

Example 5 shows an example of a join bit table, shown as an additional column added an SV file.

| SV | Token | JB bit | |
|---|---|---|---|
| 5 | abc | 1 | _this token resolves to 'abc cde' |
| 6 | abc | 1 | _this token also resolves to 'abc cde' |
| 7 | abc | 0 | _this token resolves to 'abc xyz', so the bit is flipped |
| 3 | bj | 1 | _single token chain, different: bit is flipped |
| 4 | cde | 0 | _this token resolves to 'cde', from above |
| 0 | cde | 0 | _this token also resolves to 'cde', from above |
| 2 | xyz | 1 | _token change: bit is flipped |

EXAMPLE 5

There are two other data structures which are found in the preferred embodiment and which map between the SV file and the IVF file. The LP file 54 maps SV file 50 into IVF file 36. The LP contains the same number of entries as IVF file 36 and SV file 50. Given an entry in SV file 50, the LP maps the token into IVF file 36, which then indicates the exact position of the word in the data source.

The second of these data structures is the Inverse Lexicographic Permutation (LP1), own in the figure since in this particular example it coincides with the LP. The LP1 structure maps an IVF index into a SV entry (the inverse of the LP). The LP1 contains the same number of entries as IVF file 36 and SV file 50. Given an entry in IVF file 36, the LP1 maps the token which that index represents into SV file 50.

The process of constructing the LP1, LP, SV and JB files, that is carried out by the index generator of the preferred embodiment is as follows. A pass is made over the token stream TS to produce a file, called the TSV, that like the SV file points to the next token in the sequence within the TSV structure itself, but that has entries within each run in position order (the same order as the IVF). In the example presented in FIGS. 3 and 4 the TSV coincides with the SV, so it is not shown in the figures. Once the TSV is produced, it is sorted run by run (following the chain of pointers within the TSV to resolve the lexicographic ordering) to produce the LP1 (the inverse of which is the LP). With the permutation LP1 as input it is possible to make a pass over the TSV and generate the SV on a run by run basis (by rearranging the entries within each run according to the permutation). Finally, the JB can be generated by taking the SV as input an following the chain of pointers within the SV to resolve equality of attribute entries.

The data structures described above, when utilized to generate an index for a relational database, permit the data to be indexed in a memory-efficient manner and permit relational algebra, and in particular JOINs and constrained queries, to be carried out at high speed. The lexicographic sorting of the token streams for attributes and the use of the join bit indicator permits efficient attribute matching. The alphanumeric sorting of the token streams permits the efficient location of tuples in the data source which relate to attributes located in the lexicographically sorted data. More detailed descriptions of how constrained queries and JOINs may be implemented on the data structures of the preferred embodiment are set out below.

A method for performing a constant column comparison involves a query constraint of the form "where A.b=t1 t2 . . . tn". This represents a constant column comparison on column b of table A, where the value is equal to t1 t2 . . . tn. The sequence of words t1 . . . tn represents the tokenized value to compare against. An example constant column comparison is "select A.b from A where A.b='abc efg'". The algorithm for processing queries of this form is as follows:

adjust the query token stream to be "@A.b t1 t2 . . . tn"
set last_range=(0,0)
for i=n to 1
find range=range of ti in SV
{computed from the WL structure}
reduce range to the set of indices which point into last_range [This step is done by two binary searches at the ends of range. A binary search works since the tokens are sorted lexicographically.]
if range is empty, then there are no matching rows
set last_range=range
last_range is the set of '@A.b' SV entries whose corresponding value is 't1 t2 . . . tn'.

For each SV entry in last_range, it can be converted into an IVF index through the LP structure, which then yields the information to access the row from the data source.

Turning now to a two-table join, a method is set out which accomplishes the joining of two tables A and B over columns x and y respectively. This represents the selection of all row pairs from each table where the value in column x is the same as column y. The table join to perform is of the form: where A.x=B.y (columns x in table A is the same value as column y in table B).

Due to the structure of the SV file data structure, the range of indices on the SV file corresponding to '@A.x' tokens will identify the values of the x column in table A. The SV file maintains a linked list of the tokens in each attribute. The initial token identifies the attribute ('@A.x'). The next token in the linked list of the SV file will be the first token in the attribute itself, and so forth until the 0 pointer in the linked list is reached (signifying the end of the tokens in that attribute). Because the SV file groups all identical tokens together, the @A.x tokens will all be located contiguously. Because the sort is lexicographical, the indices on the SV file (i.e. the first pointers in the linked list) will point to the first tokens in the @A.x column attributes, and these tokens will appear in order.

The range indices in the SV corresponding to '@B.y' tokens will identify the values of the y column in table B.

Because the tokens corresponding to the '@A.x' and '@B.y' ranges are in sorted order, since the SV structure is in lexicographical order, SV[Ai]<SV[Ai+1], and SV[Bi] <SV[Bi+1] for all i.

In the JB (join bit) structure, there is one bit (0 or 1) for each SV entry. In addition, JB[i]=JB[i+1] if SV[i] and SV[i+1] correspond to the same token chain for the attribute (the SV entries stop at the end of each attribute). This means that inspecting the join bit for any first token of an attribute in the SV file will indicate whether the attribute as a whole is identical to the previous attribute. This is exactly the information which is important for the join operation. The identity of a first attribute to a second is therefore determined by locating the marker for the beginning of the attribute tokens in the SV file (for example '@A.x'), and following the linked list of the SV file to the value for the first token in a first attribute. The join bit will then indicate whether there are any other identical attributes in the database (if the join bit changes from the first token in the first attribute). If there are other identical attributes, they can be identified to see whether they are attributes which are of interest (for example, whether any @B.y tokens point to them, if attributes in the B.y column are being compared).

The general approach can be illustrated in Example 6, below:

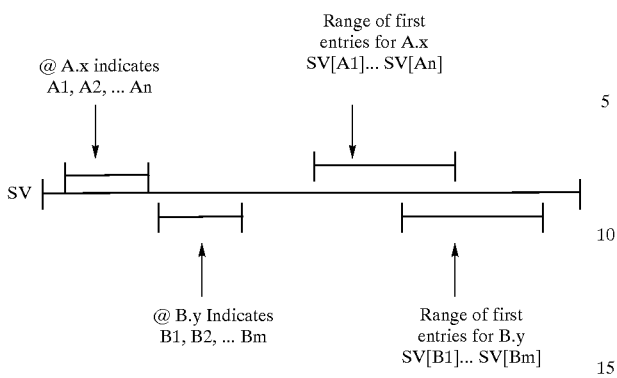

EXAMPLE 6

A method to carry out the two table join on the databases of the preferred embodiment is set out below:

for i=1 to n {A1, A2, . . . An}
for j=1 to m {B1, B2, . . . Bm}
jb_start=SV[i]
jb_end=SV[j]
exchange jb_start and jb_end if jb_start>jb_end
bit=JB[jb_start]
join=TRUE
for k=jb_start+1 to jb_end
if JB[M]? bit
{Ai and Bj do not join. Due to the lexicographical sorting, no other Bj can join, so move to the next Ai }
join=FALSE
leave this for-loop
if join==FALSE
{move to the next Ai}
leave this for-loop
else
{SUCCESS! Ai and Bj do join. Mapping though the LP structure, it is possible to convert SV[i] and SV[j] into tuple ids . . . record that SV[i] and SV[j] join}

As can be seen from the method set out above, the use of the JB table permits equality of attribute values to be quickly determined. The structure of the SV file permits access to the appropriate JB table entries to be efficiently made. The result is that the JOIN operation can be carried out with little memory access and with great speed.

Although a preferred embodiment of the present invention has been described here in detail, it will be appreciated by those skilled in the art, that variations may be made thereto, without departing from the spirit of the invention or the scope of the appended claims.

I claim:

1. An indexing system for structured or semi-structured source data, the source data being capable of being represented by a relational data view, the source data comprising data subsets which in the relational view correspond to attributes in one or more tables, each table comprising columns and rows, the indexing system comprising a tokenizer for accepting the source data and generating data tokens in a token stream representing the source data, the tokenizer comprising means for generating identifier tokens identifying the table and column of the relational view for the data subsets of the source data, the identifier tokens being inserted in the token stream to precede the data tokens for the data subsets to which the identifier tokens correspond, and an index builder for building indexes based on the token stream, the index builder creating token stream indexes which comprise a set of positional indexes for indicating the position of data tokens in the source data, a set of lexicographical indexes for indicating the lexicographical ordering of all tokens, the set of lexicographical indexes comprising a sort vector index and an associated join bit index, and a set of data structures mapping between the lexicographical indexes and the positional indexes, comprising a lexicographic permutation data structure.

2. The indexing system of claim 1 further comprising join operation means for performing relational join operations on the source data, the join operation means comprising, means for selecting a first join column and a second join column in the relational view of the source data, means for accessing the sort vector index entries for identifier tokens corresponding to the first join column and for accessing the sort vector index entries for identifier tokens corresponding to the second join column, means for determining a relational join data set for the first join column and the second join column, by accessing the sort vector index and the associated join bit index and identifying the token values for each of the attributes in the first join table column which are matched by token values for attributes in the second join column, means for accessing the source data by the positional indexes to retrieve the set of rows in the tables of the first join column and the second join column which correspond to the relational join data set.

3. The indexing system of claim 1 further comprising query operation means for performing a relational constrained query operation for a column constant on the source data, the column constant having a column identifier and an attribute value, the query operation means comprising, means for representing the column constant as a constant token stream comprising an identifier token corresponding to the column constant column identifier and data tokens corresponding to the column constant attribute value, means for accessing the sort vector index entries for identifier tokens corresponding to the column identifier, means for determining a query return data set by accessing the sort vector index and the associated join bit index to identify token values in the sort vector index which are matched by data token values in the constant column token stream, means for accessing the source data by the positional indexes to retrieve the set of rows in the tables of the relational view of the source data which correspond to the query return data set.

4. The indexing system of claim 1 in which the index builder further comprises:

means for making a pass over the token stream to produce a temporary sort vector index, means for sorting the temporary sort vector file on a run by run basis to produce an inverse lexicographic permutation index, means for making a pass over the temporary sort vector index to generate the sort vector index on a run by run basis by rearranging the entries within each run in the temporary sort vector index according to the permutation, and means for taking the sort vector index as input and following chains of pointers within the sort vector index to resolve equality of attribute entries to generate the join bit index.

5. A method for indexing structured or semi-structured source data, the source data being capable of being represented by a relational data view, the source data comprising data subsets which in the relational view correspond to attributes in one or more tables, each table comprising columns and rows, the method of indexing comprising accepting the source data and generating data tokens in a token stream representing the source data, generating identifier tokens identifying the table and column of the relational view for the data subsets of the source data, the identifier tokens being inserted in the token stream to precede the data tokens for the data subsets to which the identifier tokens correspond, and creating token stream indexes which comprise a set of positional indexes for indicating the position of data tokens in the source data, a set of lexicographical indexes for indicating the lexicographical ordering of all tokens, the set of lexicographical indexes comprising a sort vector index and an associated join bit index, and a set of data structures mapping between the lexicographical indexes and the positional indexes, comprising a lexicographic permutation data structure.

6. A computer program product tangibly embodying a program of instructions executable by a computer to perform the method steps of claim 5.

7. The method of claim 5 in which the step of creating token stream indexes further comprises:

making a pass over the token stream to produce a temporary sort vector index, sorting the temporary sort vector file on a run by run basis to produce an inverse lexicographic permutation index, making a pass over the temporary sort vector index to generate the sort vector index on a run by run basis by rearranging the entries within each run in the temporary sort vector index according to the permutation, and taking the sort vector index as input and following chains of pointers within the sort vector index to resolve equality of attribute entries to generate the join bit index.

8. The method of claim 5 further comprising steps for carrying out a join operation comprising:

selecting a first join column and a second join column in the relational view of the source data, accessing the sort vector index entries for identifier tokens corresponding to the first join column and accessing the sort vector index entries for identifier tokens corresponding to the second join column, determining a relational join data set for the first join column and the second join column, by accessing the sort vector index and the associated join bit index and identifying the token values for each of the attributes in the first join table column which are matched by token values for attributes in the second join column, and accessing the source data by the positional indexes to retrieve the set of rows in the tables of the first join column and the second join column which correspond to the relational join data set.

9. The method of claim 5 further comprising the step of carrying out a relational constrained query operation for a column constant on the source data, the column constant having a column identifier and an attribute value, the query operation comprising the steps of:

representing the column constant as a constant token stream comprising an identifier token corresponding to the column constant column identifier and data tokens corresponding to the column constant attribute value, accessing the sort vector index entries for identifier tokens corresponding to the column identifier, determining a query return data set by accessing the sort vector index and the associated join bit index to identify token values in the sort vector index which are matched by data token values in the constant column token stream, and accessing the source data by the positional indexes to retrieve the set of rows in the tables of the relational view of the source data which correspond to the query return data set.

10. A computer program product tangibly embodying a program of instructions executable by a computer to perform the method steps of claim 7, 8, or 9.

11. An indexing system for structured or semi-structured source data, the source data being capable of being represented by a relational data view, the source data comprising data subsets which in the relational view correspond to attributes in one or more tables, each table comprising columns and rows, the indexing system comprising a tokenizer for accepting the source data and generating data tokens in a token stream representing the source data, the tokenizer comprising means for generating identifier tokens identifying the table and column of the relational view for the data subsets of the source data, the identifier tokens being inserted in the token stream to be contiguous with the data tokens for the data subsets to which the identifier tokens correspond, and an index builder for building indexes based on the token stream, the index builder creating token stream indexes which comprise a set of positional indexes for indicating the position of data tokens in the source data, a set of lexicographical indexes for indicating the lexicographical ordering of all tokens in the token stream, and a set of data structures mapping between the lexicographical indexes and the positional indexes.

12. The indexing system of claim 11 in which the set of positional indexes comprises an inverted file for mapping unique tokens in the token stream to their position in the source data, a word list strings file comprising a sorted list of all unique tokens in the token stream, a word list file for mapping each token from the word list strings file to the inverted file, each entry in the word list file comprising a location in the inverted file and a run length, and a keys file.

13. The indexing system of claim 11 in which the set of lexicographical indexes comprises a sort vector index and a join bit index.

14. The indexing system of claim 11 in which the the set of data structures mapping between the lexicographical indexes and the positional indexes comprises a lexicographic permutation data structure.

15. A computer-implemented method for the indexing of structured or semi-structured source data, the source data being capable of being represented by a relational data view, the source data comprising data subsets which in the relational view correspond to attributes in one or more tables, each table comprising columns and rows, the method comprising accepting the source data and generating data tokens in a token stream representing the source data, generating identifier tokens identifying the table and column of the relational view for the data subsets of the source data, inserting the identifier tokens in the token stream to be contiguous with the data tokens for the data subsets to which the identifier tokens correspond, and building indexes based on the token stream by creating token stream indexes which comprise a set of positional indexes for indicating the position of data tokens in the source data, a set of lexicographical indexes for indicating the lexicographical ordering of all tokens in the token stream, and a set of data structures mapping between the lexicographical indexes and the positional indexes.

16. The method of claim 15 in which the set of positional indexes comprises an inverted file for mapping unique tokens in the token stream to their position in the source data, a word list strings file comprising a sorted list of all unique tokens in the token stream, a word list file for mapping each token from the word list strings file to the inverted file, each entry in the word list file comprising a location in the inverted file and a run length, and a keys file.

17. The method of claim 15 in which the the set of lexicographical indexes comprises a sort vector file and a join bit file.

18. The method of claim 15 in which the the set of data structures mapping between the lexicographical indexes and the positional indexes comprises a lexicographic permutation data structure.

19. A computer-implemented method for the indexing of structured or semi-structured source data, the source data being capable of being represented by a relational data view, the source data comprising data subsets which in the relational view correspond to attributes in one or more tables, each table comprising columns and rows, the method comprising accepting the source data and generating data tokens in a token stream representing the source data, generating identifier tokens identifying the table and column of the relational view for the data subsets of the source data, inserting the identifier tokens in the token stream to be contiguous with the data tokens for the data subsets to which the identifier tokens correspond, and building indexes based on the token stream by creating token stream indexes which comprise a set of positional indexes for indicating the position of data tokens in the source data, the set of positional indexes comprising an inverted file for mapping unique tokens in the token stream to their position in the source data, a word list strings file comprising a sorted list of all unique tokens in the token stream, a word list file for mapping each token from the word list strings file to the inverted file, each entry in the word list file comprising a location in the inverted file and a run length, and a keys file a set of lexicographical indexes for indicating the lexicographical ordering of all tokens in the token stream, comprising a sort vector index and a join bit index, and a set of data structures mapping between the lexicographical indexes and the positional indexes comprising a lexicographic permutation data structure, the step of creating token stream indexes further comprising:

making a pass over the token stream to produce a temporary sort vector index, sorting the temporary sort vector file on a run by run basis to produce an inverse lexicographic permutation index, making a pass over the temporary sort vector index to generate the sort vector index on a run by run basis by rearranging the entries within each run in the temporary sort vector index according to the permutation, and taking the sort vector index as input and following chains of pointers within the sort vector index to resolve equality of attribute entries to generate the join bit index.

20. A computer program product tangibly embodying a program of instructions executable by a computer to perform the method steps of claim 15, 16, 17, 18 or 19.

* * * * *